United States Patent
Wenger (10) Patent No.: US 9,931,603 B2
(45) Date of Patent: Apr. 3, 2018

(54) METHOD AND APPARATUS FOR EXTRUSION PROCESSING OF HIGH FIBER CONTENT FOODS

(71) Applicant: Wenger Manufacturing, Inc., Sabetha, KS (US)

(72) Inventor: Marc Wenger, Sabetha, KS (US)

(73) Assignee: Wenger Manufacturing, Inc., Sabetha, KS (US)

( * ) Notice: Subject to any disclaimer, the term of this patent is extended or adjusted under 35 U.S.C. 154(b) by 912 days.

(21) Appl. No.: 14/312,185

(22) Filed: Jun. 23, 2014

(65) Prior Publication Data

US 2015/0367298 A1    Dec. 24, 2015

(51) Int. Cl.
| | | |
|---|---|---|
| B01F 7/08 | (2006.01) |
| A23N 17/00 | (2006.01) |
| B29C 47/38 | (2006.01) |
| B29C 47/62 | (2006.01) |
| B29C 47/60 | (2006.01) |

(Continued)

(52) U.S. Cl.
CPC .............. B01F 7/086 (2013.01); A23K 10/37 (2016.05); A23K 40/20 (2016.05); A23K 40/25 (2016.05); A23K 50/80 (2016.05); A23N 17/005 (2013.01); B29C 47/6025 (2013.01);

(Continued)

(58) Field of Classification Search
CPC .. B01F 7/08; B01F 7/081; B01F 7/082; B01F 7/086; B01F 2015/0204; B01F 2215/0008; B29B 7/14; B29B 7/42; B29B 7/421; B29B 7/426; B29B 7/427; A23K 40/20; A23K 40/25; A23K 50/80; A23N 17/005; Y02P 60/877; A23P 10/25; A23P 30/20; A23P 30/25; B29C 47/38; B29C 47/385; B29C 47/62; B29C 47/625; B29C 47/627; B29C 47/50; B29C 47/70; B29C 47/6025; B29C 47/6075
USPC .... 366/88, 188, 321, 323, 133, 90; 198/657; 100/144, 148; 425/113, 205, 208
See application file for complete search history.

(56) References Cited

U.S. PATENT DOCUMENTS 3,992,500 A * 11/1976 Kruder ................ B29C 47/0871
264/102
4,074,362 A *  2/1978 Kruder ................ B29C 45/5008
366/289

(Continued)

OTHER PUBLICATIONS

International Search Report and Written Opinion dated Aug. 14, 2014 in PCT/US15/29937.

*Primary Examiner* — Joseph Drodge
(74) *Attorney, Agent, or Firm* — Hovey Williams LLP (57) ABSTRACT

An extruder (20) is specifically designed for the production of animal feed products (e.g., aquatic feeds) containing substantial quantities of low-cost fibrous materials, such as rice byproducts, at high production rates. The extruder (20) includes an elongated barrel (22) with a screw assembly (24) within the barrel and an endmost extrusion die assembly (34). The screw assembly (24) includes an inlet screw assembly (42) and a processing screw assembly (44). The assembly (44) includes screw components (50-56) of differential pitch to present a long pitch inlet section (64) and a tight pitch discharge section (68). Materials passing through the screw assembly (24) are successively subjected to high levels of steam injection (STE) followed by high levels of friction and shear (SME), so that the STE/SME ratio is at least about 6/1.

22 Claims, 5 Drawing Sheets

(51) Int. Cl.
*A23K 40/25* (2016.01)
*A23K 40/20* (2016.01)
*A23K 10/37* (2016.01)
*A23K 50/80* (2016.01)

(52) U.S. Cl.
CPC .. *B29C 47/6075* (2013.01); *B01F 2215/0008* (2013.01); *Y02P 60/877* (2015.11)

(56) References Cited

U.S. PATENT DOCUMENTS

| | | | |
|---|---|---|---|
| 4,361,081 A * | 11/1982 | Howard | B29C 47/38 100/117 |
| 4,839,193 A * | 6/1989 | Mange | A23G 3/0205 426/448 |
| 4,875,847 A * | 10/1989 | Wenger | B30B 11/243 264/211.21 |
| 4,981,711 A | 1/1991 | Kearns et al. | |
| 5,262,190 A * | 11/1993 | Cunningham | A23J 3/26 426/446 |
| 5,501,868 A * | 3/1996 | Collings | A23K 50/42 426/446 |
| 6,752,528 B1 * | 6/2004 | Durina | B29C 47/44 366/88 |
| 7,987,774 B2 * | 8/2011 | Wenger | A23N 17/005 426/445 |
| 8,246,240 B2 * | 8/2012 | Wenger | B29B 7/481 366/133 |
| 8,393,780 B2 * | 3/2013 | Wenger | A23N 17/005 366/301 |
| 8,827,539 B2 * | 9/2014 | Wenger | A23N 17/005 366/85 |
| 2006/0118980 A1 | 6/2006 | Yamada et al. | |
| 2007/0237850 A1 | 10/2007 | Wiltz et al. | |
| 2008/0223223 A1 * | 9/2008 | Wenger | A23N 17/005 99/447 |
| 2009/0155439 A1 * | 6/2009 | Gingras | A23L 7/198 426/507 |
| 2010/0062093 A1 | 3/2010 | Wenger et al. | |
| 2015/0016211 A1 | 1/2015 | VanDalsem et al. | |

* cited by examiner

METHOD AND APPARATUS FOR EXTRUSION PROCESSING OF HIGH FIBER CONTENT FOODS

BACKGROUND OF THE INVENTION

Field of the Invention

The present invention is broadly concerned with improved extruders and screw configurations designed for the economical production of animal feed products containing high quantities of fibrous ingredients. More particularly, it is concerned with such extrusion equipment which is capable of processing feed products, e.g., aquatic feeds, containing in excess of 20% by weight of fibrous ingredients at commercially acceptable production rates.

Description of the Prior Art

The aquaculture industry commonly makes use of extruded feed products having various nutritional profiles and operational characteristics, such as sink rates. For example, an acceptable salmon feed would have very different properties as compared with a shrimp feed. Accordingly, in the production of these feeds, the ingredients must be carefully selected and processed so as to achieve the optimal feed for a particular aquatic creature.

Many aquatic feeds rely on expensive ingredients, such as fish meal, to provide appropriate levels of nutrition and operational characteristics. In an effort to reduce costs, processors have endeavored to use less expensive, fibrous ingredients (e.g., rice byproducts) as at least a partial substitute for higher value ingredients. However, these fibrous ingredients when used at levels above about 20% by weight, can be difficult to extrude at commercially useful rates. That is, while conventional extrusion equipment can process high fibrous ingredient feeds, the normal throughput for such equipment is significantly reduced, perhaps as much as 50%. If this equipment is operated at normal production rates, the resultant feeds are structurally weak and tend to crumble, and are not acceptable to end users. Accordingly, it has heretofore not been practical to use high levels of fibrous ingredients in aqua feeds, notwithstanding the potential cost savings which could be realized with such feed formulas.

There is accordingly a need in the art for improved extrusion equipment and processes which can provide fully acceptable aqua feeds having levels of fibrous ingredients above 20% by weight, while still achieving production throughputs making the feeds economically advantageous.

SUMMARY OF THE INVENTION

The present invention overcomes the problems outlined above and provides extrusion equipment in the form of complete extrusion assemblies and extrusion screw assemblies which permit economical, high-capacity production of animal feeds including elevated quantities of fibrous ingredients above 20% by weight. In general, extruders in accordance with the invention comprise an elongated barrel having an inlet adjacent one end thereof and a restricted opening die assembly adjacent the opposite end thereof. At least one axially rotatable processing screw assembly is located within the barrel between the inlet and die assembly. This screw assembly comprises a plurality of screw components in end-to-end alignment including an entrance component and an exit component, with each screw component including an elongated shaft, and outwardly extending helical flighting along the length of the shaft presenting a flighting diameter, an inlet section, and a discharge section. Thus, each of the screw component sections has an axial length and a pitch, wherein: (a) the axial length of the inlet section is greater than the axial length of the discharge section; and (b) the pitch of the inlet section being at least about six times (more preferably at least about ten times) greater than the pitch of the discharge section. The screw components are moreover arranged end-to-end with the discharge section of the entrance screw component proximal to the inlet section of the exit screw component.

In preferred forms, the screw component sections have respective flighting wrap extents, with the flighting wrap of the discharge section being greater than the flighting wrap of the inlet section. Advantageously, at least certain of the screw components include an intermediate section between the inlet section and the discharge section, with the intermediate section having an axial length and a pitch, the length of the inlet section being greater than the length of the intermediate section. Also, the flighting wrap of the intermediate section is substantially equal to the flighting wrap of the inlet section.

In order to provide flow restrictions and greater shear along the length of the extruder, flow restricting elements may be provided between the discharge sections and inlet sections of the screw assembly components. These elements may comprise steam lock dies or adjustable extruder barrel valves. The extruder barrel is also normally equipped with a plurality of ports for injection of steam into the confines of the barrel, with the ports located adjacent the inlet sections of at least certain of the screw components. In preferred forms, the injection ports are located at an angle (e.g., 45°) relative to the longitudinal axis of the barrel, and are equipped with rotatable ball valve steam injection assemblies.

A feature of the present invention is that the extrusion equipment is designed to process comestible feed ingredients using relatively high levels of specific thermal energy (STE) derived steam/water injection, with lower specific mechanical energy (SME) inputs, as compared with conventional equipment. To this end, the extrusion screw assembly within the extruder barrel is designed to alternately convey and work the feed ingredients while permitting injection of significant amounts of steam into the barrel. Thus, the extruder provides alternating zones of steam injection with zones of high friction and shear so that the material is fully hydrated and cooked. At the same time, operation of the extruder does not require very high horsepower, and does not result in undue wear on the extruder parts.

DETAILED DESCRIPTION OF THE PREFERRED EMBODIMENT

Figure 1:
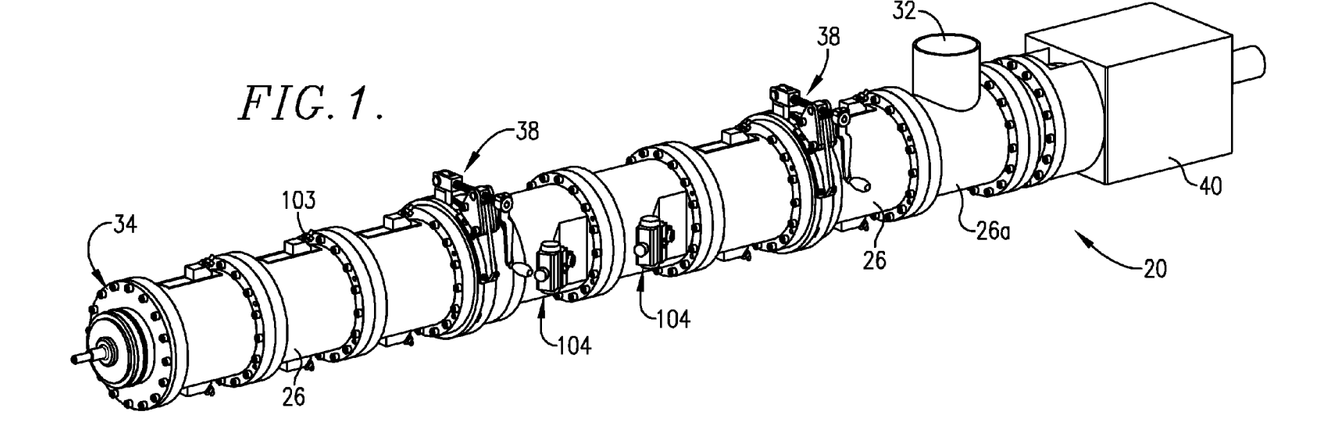
FIG. 1 is a perspective view of the improved extruder in accordance with the invention, illustrated with valve-type steam injectors.
Figure 2:
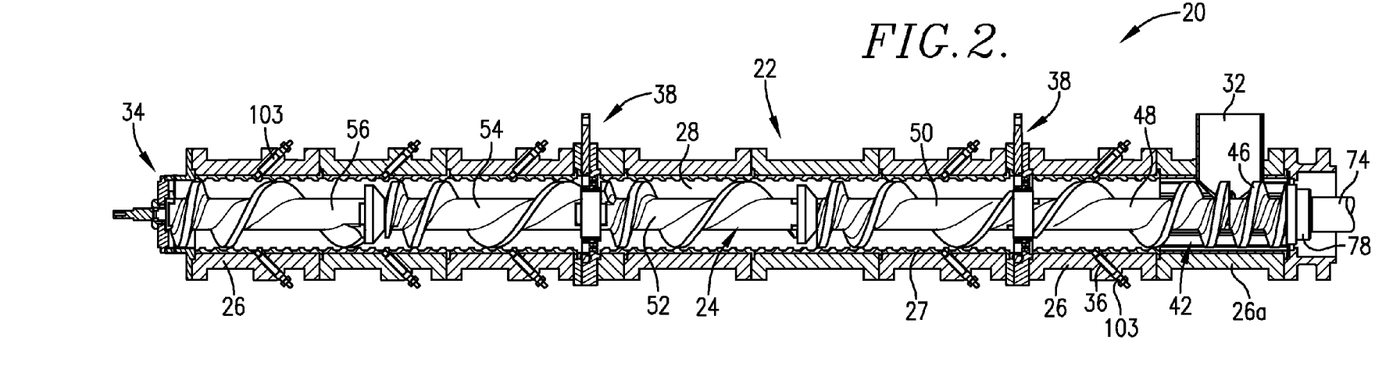
FIG. 2 is a vertical sectional view of an extruder similar to that of FIG. 1, but showing the use of conventional tubular steam injectors.

Turning now to the drawings, a single screw extruder 20 is illustrated in FIGS. 1 and 2, and generally includes an elongated barrel 22 with an elongated, axially rotatable screw 24 situated within the barrel 22. The barrel 22 has a plurality of tubular sections or heads 26, including an inlet head 26a, bolted together in an end-to-end relationship to present an internal bore 28 extending the full length of the barrel. In the depicted embodiment, each of the heads 26 save for inlet head 26a is equipped with an inner, helically ribbed sleeve 27.

Figure 3:
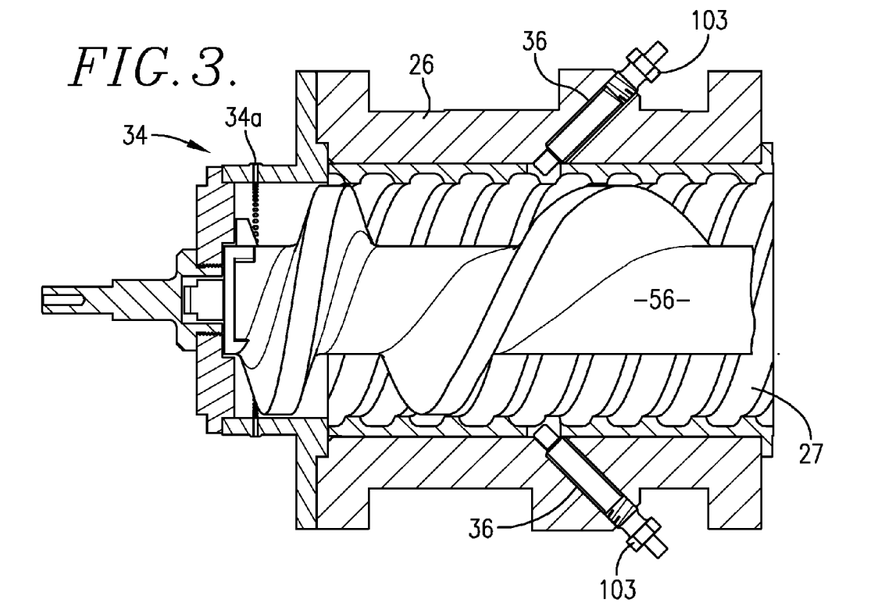
FIG. 3 is a sectional view of the outlet die end of the extruder depicted in FIGS. 1-2, and showing the orientation of steam injectors.

The inlet head 26a includes an upright, tubular material inlet 32 for feeding material into the barrel 22 for processing. The opposite end of the barrel 22 is equipped with a die assembly 34 presenting restrictive orifice outlets 34a for the material being processed (see FIG. 3). The barrel 22 is also equipped with a series of obliquely oriented steam injection ports 36 along the length thereof, together with a pair of manually operable back pressure valve assemblies 38, all of which are important for purposes to be explained. The screw 24 is operatively coupled with a schematically illustrated bearing assembly 40 and with a conventional drive motor (not shown). In general, comestible materials to be processed are passed into barrel 22 via inlet 32, and are subjected to increasing levels of temperature, pressure, and shear during passage through the barrel; the products are then forced through the orifices of die assembly 34 in order to form the product.

The screw 24 generally has an inlet screw assembly 42 and a processing screw assembly 44. As illustrated, the inlet screw assembly 42 is located within inlet head 26a and the next adjacent head 26 (FIG. 2), whereas the processing screw assembly 44 extends from the forward end of assembly 42 to die assembly 34. The purpose of assembly 42 is to quickly convey material from inlet 32 toward and into the assembly 44, where the bulk of the processing of material occurs.

The assembly 42 includes a short, relatively tight pitch screw element 46 directly beneath inlet 32, and a longer pitch element 48 leading towards the inlet end of assembly 44. A careful study of FIG. 2 will confirm that the inlet screw assembly 42 is identical with the later-described screw components forming a part of the processing screw assembly 44, except that the assembly 42 is reversed, as compared with these screw components.

Figure 5:
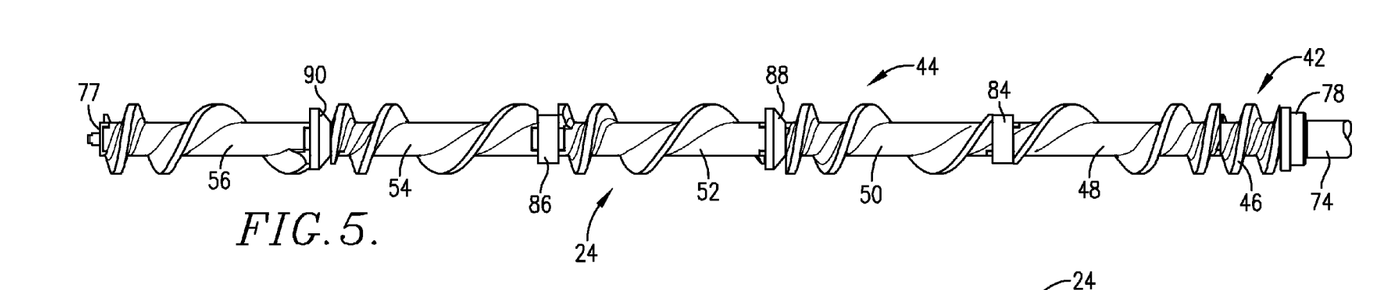
FIG. 5 is an elevational view of the preferred extruder screw assembly of the invention.

The processing screw assembly 44 includes a total of four identical screw components 50, 52, 54, and 56 located in end-to-end alignment, as best illustrated in FIGS. 2 and 5. The screw component 50 is an entrance component, the components 52 and 54 are middle components, and component 56 is the exit component.

Figure 10:
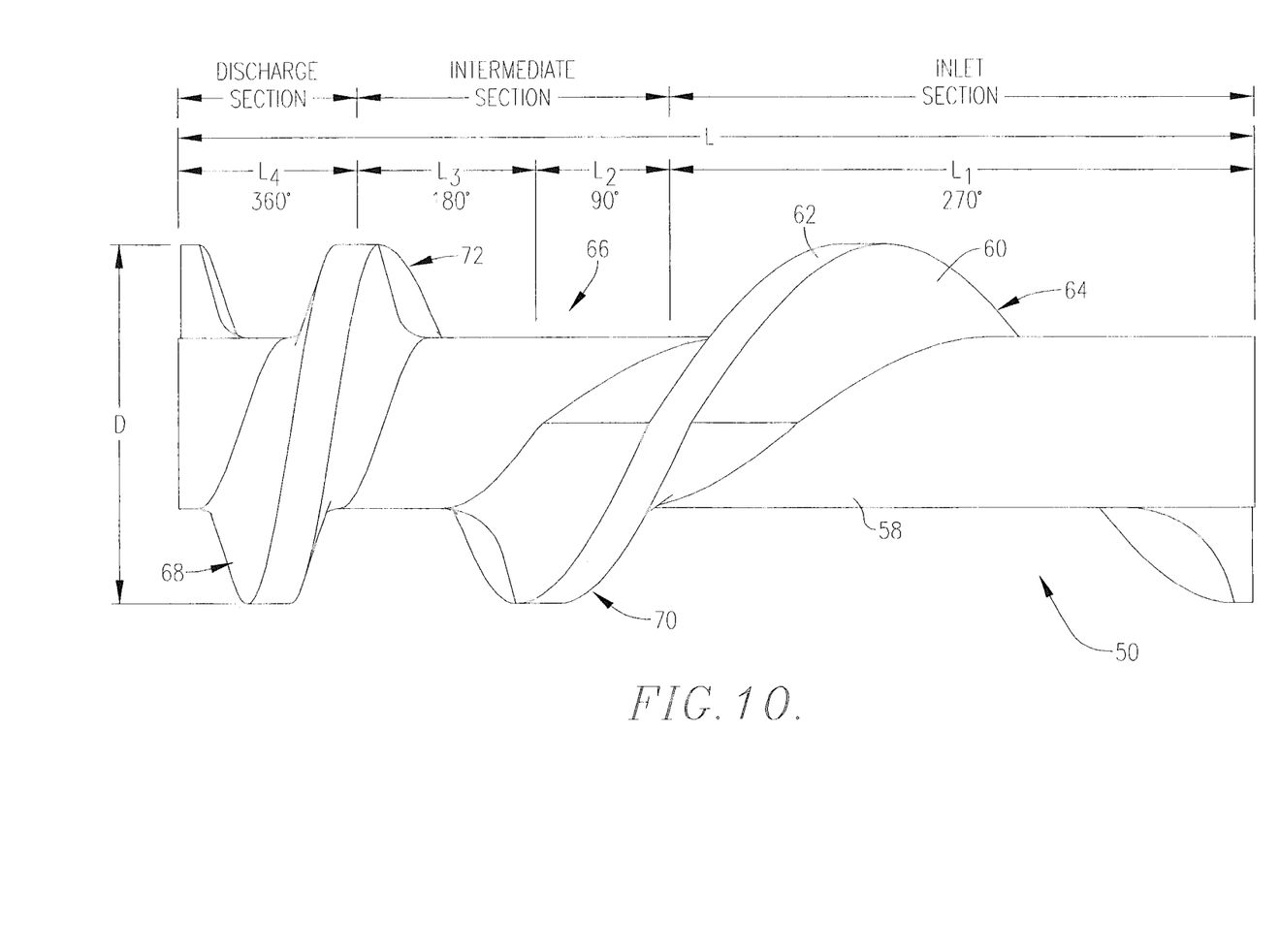
FIG. 10 is an enlarged elevational view of the preferred screw component of the invention, illustrating various geometrical features of the component.

As indicated, the components 50-56 are identical, and are best described with reference to FIG. 10 where the entrance component 50 is illustrated. Specifically, the component 50 includes an elongated shaft 58 with outwardly extending helical flighting 60 along the length of the shaft, which presents an outer peripheral surface 62. The surface defines the flighting diameter D of the component. The configuration of the flighting 60 effectively creates three sections along the length of the component 50, namely an inlet section 64, an intermediate section 66, and a discharge section 68. The intermediate section 66 is in turn divided into a first subsection 70 and a second subsection 72. Each of the sections 64 and 68-72 presents an axial length L, a flighting pitch length, and a flighting wrap about the shaft 58.

Referring first to the inlet section 64, it will be seen that there is a length $L_1$ equal to 13.81275 inches or 1.625×D, with a pitch of 18.417 inches or 2.17×D, a flighting wrap of 270°, a flighting surface area of 1619 sq cm, and a free volume of 8931 cc. The subsection 70 has a length $L_2$ of 3.187 inches or 0.375×D, a pitch of 12.750 inches or 1.5×D, a flighting wrap of 90°, a flighting surface area of 413 sq cm, and a free volume of 1950 cc. Subsection 72 has a length $L_3$ of 4.25 inches or 0.5×D, a pitch of 8.5 inches or 1×D, a flighting wrap of 180°, a flighting surface area of 651 sq cm, and a free volume of 2441 cc. Finally, the discharge section 68 has a length $L_4$ of 4.25 inches or 0.5×D, a pitch of 4.25 inches or 0.5×D, a flighting wrap of 360° a flighting surface area of 845 sq cm, and a free volume of 2013 cc. Considering the entire screw component 50, the total flighting surface area of 3528 sq cm, and the total free volume is 18,883 cc. The screw diameter D is 8.5 inches, giving a total length/diameter ratio (L/D) of 3. Importantly, it will be seen that the length $L_1$ is greater than the individual lengths $L_2$, $L_3$, and $L_4$, and is moreover greater than the combined length of the intermediate section 66, namely $L_2+L_3$. In the depicted exemplary embodiment, the overall length of the component 50 is 25.5 inches, or 3×D.

The foregoing dimensions and features represent the presently most preferred screw component design. Of course, these are subject to variations depending upon the type of feed ingredients being processed, the desired throughput, and other factors. To this end, the following Table 1 sets forth broad and preferred ranges for these dimensions and features, some of which are set forth in terms of D, as indicated in FIG. 10. It will also be appreciated that variation in one of the dimensions, for example, may require corresponding changes in other dimensions or features, in order to provide an optimized screw component; however, these variations may be determined through routine testing.

TABLE 1

| Section No. | | Inlet 64 | Subsection 70 | Subsection 72 | Discharge 68 |
|---|---|---|---|---|---|
| Length/Diameter | Broad | 0.8-2 | 0.1-0.7 | 0.05-0.9 | 0.1-0.9 |
| (L/D) | Preferred | 1.2-1.8 | 0.2-0.6 | 0.3-0.7 | 0.3-0.7 |

TABLE 1-continued

| Section No. | | Inlet 64 | Subsection 70 | Subsection 72 | Discharge 68 |
|---|---|---|---|---|---|
| Pitch (xD) | Broad | 1.5-2.8 | 1.0-2.0 | 0.5-2.0 | 0.1-0.9 |
| | Preferred | 1.8-2.5 | 1.2-1.8 | 0.8-1.4 | 0.3-0.7 |
| Wrap (°) | Broad | 180-450 | 45-180 | 90-360 | 180-450 |
| | Preferred | 200-360 | 60-120 | 150-240 | 240-400 |
| Flighting Surface | Broad | 1245-2105 | 318-537 | 501-846 | 650-1098 |
| Area (sq. cm) | Preferred | 1407-1861 | 359-475 | 566-749 | 735-972 |
| Free Volume (cc) | Broad | 6870-11610 | 1500-2536 | 2160-3173 | 1563-2642 |
| | Preferred | 7766-10270 | 1697-2244 | 2123-2807 | 1767-2337 |

The screw 24 is preferably fabricated using a drive shaft 74 operably coupled to the assembly 40 and having a hex drive component 76 and a forwardly extending, smooth shaft 76a, which extends the full length of the screw 24. A hex coupler 78 is mounted on shaft 76a and is drivingly secured to the component 76, and has forwardly extending drive lugs 80. The lugs 80 drivingly interfit with the short pitch screw element 46, which likewise includes drive lugs 82. The remaining parts of the assembly 24 are similarly mounted on the shaft 76a and connected and interfitted end-to-end, so that all of the parts are ultimately driven via hex drive component 76. The outer end of the screw 24 has a retainer bolt assembly 77, which is secured to the butt end of the shaft 76a to complete the screw construction. It has been found that this screw construction is adequate for the extruder 20 and is less expensive than using a central splined shaft with complementally formed screw parts.

Figures 6, 7:
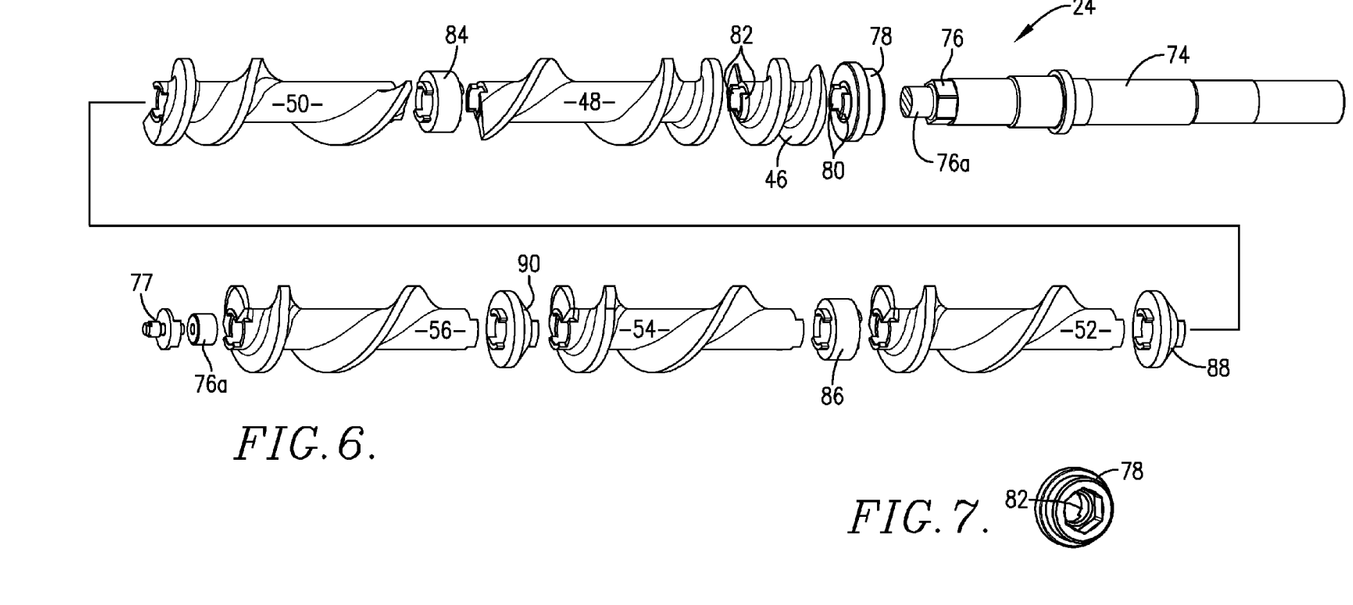
FIG. 6 is an exploded view of the screw assembly illustrating the respective components and the drive connection thereof.
FIG. 7 is a perspective view of one of the hexagonal couplers used in the preferred screw assembly.

As illustrated in FIGS. 5 and 6, a back pressure valve spacer mount 84 is interposed between the forward end of longer pitch screw element 48 and the inlet end of screw component 50; similarly, an identical spacer mount 86 is interposed between the discharge end of screw component 52 and the inlet end of screw component 54. Also, a frustoconical shear lock 88 is connected between the discharge end of screw component 50 and the inlet end of screw component 52. An identical shear lock 90 is interposed between the discharge end of screw component 54 and the inlet end of screw component 56.

Figures 8, 9:
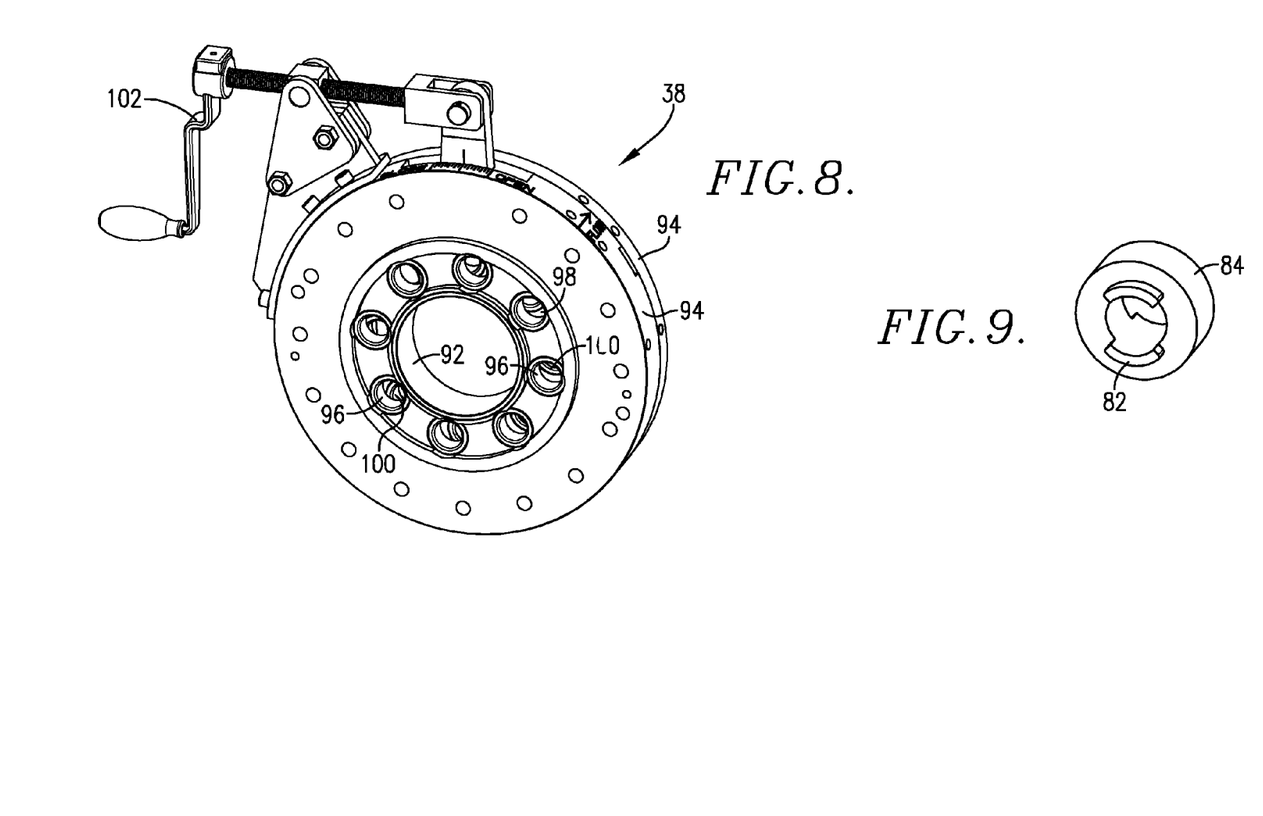
FIG. 8 is a perspective view of a manually adjustable mid-barrel valve forming a part of the preferred screw assembly.
FIG. 9 is a perspective view of a mid-barrel valve mounting spacer used with the valve illustrated in FIG. 8.

Each of the mounts 84, 86 supports a conventional back pressure valve assembly 38 (FIGS. 8-9). The assembly 38 includes a central opening 92 designed to fit over the mount 84 and a pair of stationary plates 94 having a series of circularly arranged and aligned apertures 96 formed therein. The assembly 38 also includes an inner rotatable plate 98 between the plates 94 likewise having through apertures 100. The plate 98 is rotatable via hand crank assembly 102 in order to selectively move the plate 98 relative to the plate 94, thereby permitting adjustment of the effective through passages provided by the openings 96, 100.

Figure 4:
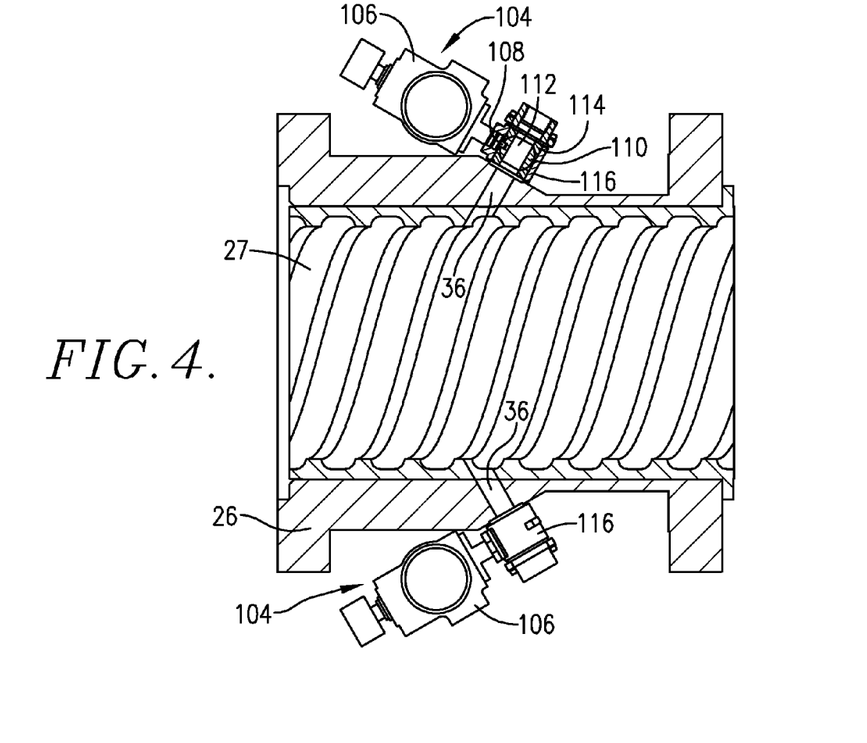
FIG. 4 is a vertical sectional view of the mid-section of the extruder barrel, and illustrating the preferred rotary ball valve steam injectors.

As indicated previously, the barrel 24 has a plurality of obliquely oriented ports 36. These are strategically arranged so that steam is injected into the barrel at the regions of the inlet sections 64 of the screw components 50-56. Tubular injection inserts 103 may be located within the ports 36, which are connected with external water/steam lines (not shown). If desired, ball valve-operated injected assemblies 104 may be operably coupled with some or all of the ports. Each assembly 104 (FIG. 4) includes a selectively actuatable valve body 106 having an internal mechanical drive (not shown) with an outwardly extending, axially rotatable stem 108. The stem 108 is connected to a spherical valve ball 110 having a central passageway 112. The ball 110 is located within a tubular segment 114, which is received within an outer valve sleeve 116. Selective rotation of the ball 110 serves to open and close the valve 104 as desired. In preferred practice, the valve assembly 104 is an automated valve, which can be controlled as a part of an overall digital control system for the extruder 20. Further details regarding the valve 104 can be found in application for U.S. letters patent Ser. No. 13/937,573, filed Jul. 9, 2013, and incorporated by reference herein in its entirety.

Operation

The extruder 20 is specifically designed for the production of animal feeds, and especially aqua feeds, containing high quantities of fibrous ingredients. These feed formulations would also typically include sources of animal or marine protein (e.g., fish meal), vegetable proteins (e.g., soy meal), starch less than 30%, with a minimum of 10% (e.g., grains such as wheat or corn), oil or fat, and minor ingredients such as vitamin/mineral premixes.

Suitable fibrous ingredients include rice byproducts (e.g., hulls and bran), wheat bran, wheat middlings, distillers' dried grains, and byproducts from the oil seed industry including cottonseed cake, copra meal, groundnut meal, palm kernel meal, citrus pulp, sugar beet pulp, bagasse, linseed meal, sunflower meal, soy hulls, feather meal, guar meal, banana meal, rapeseed meal, canola meal, and mustard seed meal, and mixtures thereof.

The initial ingredients are passed in serial order through a preconditioner and then through the extruder 20. In the preconditioner, the feed ingredients are moisturized and at least partially cooked before extrusion. The preconditioner may be any one of a number of devices, such as Wenger preconditioners commercialized under the designations "DDC" or "HIP." The DDC preconditioners are the type disclosed in U.S. Pat. No. 4,752,139, whereas the HIP preconditioners are disclosed in U.S. Pat. No. 7,674,492. Both of these patents are incorporated herein in their entireties. Generally, the preconditioner is operated so as to achieve a temperature of from about 60-100° C., with a residence time of from about 15 seconds-3 minutes, and more preferably from about 2-3 minutes to obtain the maximum amount of hydration of the feed ingredients and preliminary cooking thereof.

The operating conditions of the extruder 20 are also variable, but, as a general proposition, the temperatures within barrel 22 range from about 25-180° C., more preferably from about 40-120° C., with generally higher temperatures as the material proceeds from inlet 32 through die assembly 34. Internal barrel pressures are typically within the range of 200-900 psi, more preferably from about 300-600 psi. Material residence times in the extruder range from about 8-40 seconds, more preferably from about 10-15 seconds.

As the preconditioned starting materials pass into the barrel 22, they are first rapidly conveyed by the inlet screw assembly 42 towards the processing screw assembly 44. During such transfer, the materials pass through the first valve barrel 38. The material then is advanced along the length of the first component 50 by the inlet section 64 thereof towards and into the intermediate section 66. During this passage, steam is injected into the material, this being facilitated because of the free volume of the inlet section and the fact that it is not full of feed material ingredients. Furthermore, the material is rolled over the tips of the flighting (leakage flow) to facilitate mixing of the ingredients. Stated otherwise, in the inlet section, thermal energy input is maximized and the materials are subjected to distributive mixing to ensure that the injected steam is properly absorbed. During passage of the material through the intermediate zone 66, the material is compacted leading to the discharge section 68, where the barrel is full of material to increase friction and shear, thus maximizing SME. This process is repeated within the components 52, 54, and 56, whereupon the material is extruded through die assembly 34. It will also be noted that restrictive elements, namely the shear locks 88 and 90, and barrel valve 38, are positioned between adjacent screw components, in order to provide still further SME input.

In one series of tests, the preferred extruder 20 was tested versus a conventional Wenger X165 single screw extruder heretofore used for the production of aquatic feeds. The same preconditioner was used in each test. The same feed ingredients were also used in each case, where the amount of fibrous ingredients exceeded 20% by weight. The following Table 2 sets for the results of these runs, wherein Runs 1-3 were carried out using the extruder of the invention, and Run 4 was carried out using the conventional extruder.

TABLE 2

|  | Run No. | | | |
| --- | --- | --- | --- | --- |
|  | 1 | 2 | 3 | 4 |
| Dry Feed Rate (kg/hr) | 2000 | 2000 | 4554 | 4500 |
| Steam/Water to Preconditioner (%) | 10/13 | 10/13 | 11/22 | 8/12.5 |
| Steam/Water to Extruder (%) | 8/5 | 5/5 | 4.8/3.1 | 5/2 |
| SME (kWhr/t) | 13 | 14 | 18.1 | 38.3 |
| STE (kWhr/t) | 141 | 118 | 126 | 102 |
| STE/SME Ratio | 10.8/1 | 8.4/1 | 14.4/1 | 2.7/1 |
| Product Density (g/l) | 350 | 341 | — | 402 |
| Product Moisture (%) | 25.8 | 25.9 | 31.6 | — |

As is evident from the foregoing data, the present invention provides much higher STE/SME ratios, preferably at least about 6/1, and more preferably from about 7-15/1. At the same time, the products produced using he extrusion equipment of the invention were of high quality and fully commercially acceptable.

I claim:

1. A single screw extruder processing screw assembly comprising a plurality of screw components in end-to-end alignment with each screw component including an elongated shaft and outwardly extending helical flighting along the length of said shaft, said flighting being of the same hand and presenting an inlet portion, an intermediate portion, and a discharge portion, the pitch x diameter values of said inlet, intermediate, and discharge portions being different, and including at least one flow-restricting element between the discharge portion of one of said components, and the inlet portion of the next adjacent component, said inlet portion having a length $L_1$, a fighting diameter $D_1$, and a pitch $P_1$, said intermediate portion comprising first and second sub-portions, said first sub-portion having a length $L_2$, a flighting diameter $D_2$, and a pitch $P_2$, said second sub-portion having a length $L_3$, a fighting diameter $D_3$, and a pitch $P_3$, and said discharge portion having a length $L_4$, a flighting diameter $D_4$, and a pitch $P_4$, said inlet portion having an $L_1/D_1$ ratio of from about 0.8-2 and a pitch $P_1 \times D_1$ of from about 1.5-2.8, said first sub-portion having an $L_2/D_2$ ratio of from about 0.1-0.7 and a pitch $P_2 \times D_2$ of from about 1.0-2.0, said second sub-portion having an $L_3/D_3$ ratio of from about 0.05-0.9 and a pitch $P_3 \times D_3$ of from about 0.5-2.0, said discharge portion having an $L_4/D_4$ ratio of from about 0.1-0.9 and a pitch $P_4 \times D_4$ of from about 0.1-0.9, the length $L_1$ being greater than the individual lengths $L_2$, $L_3$, and $L_4$, and also greater than the combined length of $L_2$ and $L_3$.

2. The assembly of claim 1, said inlet portion having a wrap $W_1$ of from about 180-450°, said first sub-portion having a wrap $W_2$ of from about 45-180° said second sub-portion having a wrap $W_3$ of from about 90-360°, and said discharge portion having a wrap $W_4$ of from about 180-450°.

3. The assembly of claim 1, said inlet portion having a fighting surface $S_1$ of from about 1245-2105 sq·cm, said first sub-portion having a fighting surface $S_2$ of from about 318-537 sq·cm, said second sub-portion having a flighting surface $S_3$ of from about 501-846 sq·cm, and said discharge portion having a fighting surface $S_4$ of from about 650-1098 sq·cm.

4. The assembly of claim 1, said inlet portion having a free volume $V_1$ of from about 6870-11610 cc, said first sub-portion having a free volume $V_2$ of from about 1500-2536 cc, said second sub-portion having a free volume $V_3$ of from about 2160-3173 cc, and said discharge portion having a free volume $V_4$ of from about 1563-2642 cc.

5. The assembly of claim 1, the pitch $P_1$ of said inlet portion throughout the axial length thereof being greater than the pitch $P_4$ of said discharge portion.

6. The assembly of claim 1, said $L_1/D_1$ being greater than any of said $L_2/D_2$, $L_3/D_3$, or $L_4/D_4$.

7. The assembly of claim 1, said $P_1 \times D_1$ being greater than any of said $P_2 \times D_2$, $P_3 \times D_3$, or $P_4 \times D_4$.

8. The assembly of claim 1, said $W_4$ being greater than any of said $W_1$, $W_2$, or $W_3$.

9. The assembly of claim 1, said $S_1$ being greater than any of said $S_2$, $S_3$, or $S_4$.

10. The assembly of claim 1, said $V_1$ being greater than any of said $V_2$, $V_3$, or $V_4$.

11. The assembly of claim 1, said $D_1$, $D_2$, $D_3$, and $D_4$ being equal.

12. A single screw extruder comprising:

an elongated barrel having an inlet adjacent one end thereof and a restricted opening die assembly adjacent the opposite end thereof;

a single axially rotatable processing screw assembly located within said barrel between said inlet and said die assembly, said assembly comprising a plurality of screw components in end-to-end alignment with each screw component including an elongated shaft and outwardly extending helical fighting along the length of said shaft, said flighting being of the same hand and presenting an inlet portion, an intermediate portion, and a discharge portion, the pitch x diameter values of said inlet, intermediate, and discharge portions being different, and including at least one flow-restricting element between the discharge portion of one of said components, and the inlet portion of the next adjacent component, said inlet portion having a length $L_1$, a fighting diameter $D_1$, and a pitch $P_1$, said intermediate portion comprising first and second sub-portions, said first sub-portion having a length $L_2$, a fighting diameter $D_2$, and a pitch $P_2$, said second sub-portion having a length $L_3$, a fighting diameter $D_3$, and a pitch $P_3$, and said discharge portion having a length $L_4$, a flighting diameter $D_4$, and a pitch $P_4$, said inlet portion having an $L_1/D_1$ ratio of from about 0.8-2 and a pitch $P_1 \times D_1$ of from about 1.5-2.8, said first sub-portion having an $L_2/D_2$ ratio of from about 0.1-0.7 and a pitch $P_2 \times D_2$ of from about 1.0-2.0, said second sub-portion having an $L_3/D_3$ ratio of from about 0.05-0.9 and a pitch $P_3 \times D_3$ of from about 0.5-2.0, said discharge portion having an $L_4/D_4$ ratio of from about 0.1-0.9 and a pitch $P_4 \times D_4$ of from about 0.1-0.9, the length $L_1$ being greater than the individual lengths $L_2$, $L_3$, and $L_4$, and also greater than the combined length of $L_2$ and $L_3$.

13. The extruder of claim 12, said inlet portion having a wrap $W_1$ of from about 180-450°, said first sub-portion having a wrap $W_2$ of from about 45-180° said second sub-portion having a wrap $W_3$ of from about 90-360°, and said discharge portion having a wrap $W_4$ of from about 180-450°.

14. The extruder of claim 12, said inlet portion having a fighting surface $S_1$ of from about 1245-2105 sq·cm, said first sub-portion having a flighting surface $S_2$ of from about 318-537 sq·cm, said second sub-portion having a fighting surface $S_3$ of from about 501-846 sq·cm, and said discharge portion having a fighting surface $S_4$ of from about 650-1098 sq·cm.

15. The extruder of claim 12, said inlet portion having a free volume $V_1$ of from about 6870-11610 cc, said first sub-portion having a free volume $V_2$ of from about 1500-2536 cc, said second sub-portion having a free volume $V_3$ of from about 2160-3173 cc, and said discharge portion having a free volume $V_4$ of from about 1563-2642 cc.

16. The extruder of claim 12, the pitch $P_1$ of said inlet portion throughout the axial length thereof being greater than the pitch $P_4$ of said discharge portion.

17. The extruder of claim 12, said $L_1/D_1$ being greater than any of said $L_2/D_2$, $L_3/D_3$, or $L_4/D_4$.

18. The extruder of claim 12, said $P_1 \times D_1$ being greater than any of said $P_2 \times D_2$, $P_3 \times D_3$, or $P_4 \times D_4$.

19. The extruder of claim 12, said $W_4$ being greater than any of said $W_1$, $W_2$, or $W_3$.

20. The extruder of claim 12, said $S_1$ being greater than any of said $S_2$, $S_3$, or $S_4$.

21. The extruder of claim 12, said $V_1$ being greater than any of said $V_2$, $V_3$, or $V_4$.

22. The extruder of claim 12, said $D_1$, $D_2$, $D_3$, and $D_4$ being equal.

* * * * *